United States Patent [19]

Mundy et al.

[11] 3,808,458

[45] Apr. 30, 1974

[54] DYNAMIC SHIFT REGISTER

[75] Inventors: Joseph L. Mundy; Reuben E. Joynson, both of Schenectady, N.Y.

[73] Assignee: General Electric Company, Schenectady, N.Y.

[22] Filed: Nov. 30, 1972

[21] Appl. No.: 310,990

[52] U.S. Cl. .............. 307/221 C, 307/205, 307/251

[51] Int. Cl. .............................................. G11c 11/40

[58] Field of Search ............ 307/205, 221 R, 221 C, 307/221 D, 251, 279, 304

[56] References Cited

UNITED STATES PATENTS

| | | | |
|---|---|---|---|
| 3,648,063 | 3/1972 | Hoffman | 307/221 C |
| 3,678,290 | 7/1972 | Booner | 307/205 |
| 3,691,537 | 9/1972 | Burgess | 307/279 |
| 3,699,544 | 10/1972 | Joynson | 307/279 |
| 3,705,390 | 12/1972 | Mundy | 307/279 |
| 3,683,203 | 8/1972 | Smith | 307/221 C |
| 3,573,487 | 4/1971 | Polkinghorn | 307/205 |
| 3,731,114 | 5/1973 | Gehweiler | 307/221 C |
| 3,575,609 | 4/1971 | Izumi | 307/304 |
| 3,610,951 | 10/1971 | Howland | 307/221 C |
| 3,573,490 | 4/1971 | Sevin | 307/221 C |

*Primary Examiner*—Rudolph V. Rolinec
*Assistant Examiner*—R. E. Hart
*Attorney, Agent, or Firm*—Paul F. Wille; Joseph T. Cohen; Jerome C. Squillaro

[57] ABSTRACT

A dynamic shift register is disclosed utilizing four field effect transistors and two voltage variable capacitors per stage. A two phase clock signal is used to shift information through the register. The information is not inverted as it passes through each stage and is refreshed by being transferred from one stage to the next.

7 Claims, 3 Drawing Figures

DYNAMIC SHIFT REGISTER

This invention relates to shift registers and, in particular, to shift registers utilizing field effect transistors (FET).

In the register art, shift registers, in which the information is not counted per se but rather is stored and transferred from one stage to the next in response to a "shift" input signal, have achieved widespread use in a variety of applications. A continuing problem, however, is to reduce the size, cost and power consumption of these devices so that more can be used.

In the prior art, the use of integrated circuits instead of discrete devices greatly reduced the size, etc. of these devices. The problem still remains, however, in terms of having each bit storage area or stage of the register occupy as small an area of semiconductor as possible. In addition, the speed of the stage has become of increasing importance.

One type of shift register stage used in the prior art utilizes four FET transistors and a two phase clock or shift signal. Each stage comprises two halves wherein each half comprises two transistors having their source-drain paths connected in series. The difficulty with this arrangement is that one transistor in each pair is a load transistor and, hence, is physically quite large. In addition, the capacitance associated with the gate and drain of the driver is large, making the stage slow, e.g., typically requiring 500–1000 ns. per stage for transfer. Further, threshold losses occur in the stage which reduce the available drive voltage, thereby slowing the stage even further.

Another type of shift register stage employs six transistors and a two phase clock signal. Each stage comprises two halves, each comprising three transistors having their source-drain paths series connected. This stage is somewhat faster than the one described above, but occupies about the same area due to the extra transistors and also suffers from threshold losses.

Thus, there is a need in the art for a low cost, high density, high speed shift register. There is also a need for shift registers utilizing FET's in which threshold losses are eliminated or minimized.

In view of the foregoing, it is therefore an object of the present invention to provide an improved FET shift register.

It is another object of the present invention to provide an improved integrated circuit shift register wherein each stage occupies less area on the semiconductor substrate than has been obtained heretofore.

A further object of the present invention is to provide an improved shift register wherein threshold voltage losses are minimized or eliminated.

Another object of the present invention is to provide an improved high speed shift register stage.

The foregoing objects are achieved in the present invention wherein each stage of the shift register comprises two halves, wherein each half comprises two transistors and one voltage variable capacitor. The drain of the first transistor forms the input to that half and the source of the first transistor is connected to the gate of the second transistor. The source of the second transistor forms the output for that half. The voltage variable capacitor is connected between the gate and drain of the second transistor. In the first half, the gate of the first transistor is connected to a first phase of a two phase clock signal and the drain of the second transistor is connected to the second phase of the two phase clock signal. For the second half, the connections to the clock signals are the converse, i.e., the gate of the first transistor is connected to the second clock signal and the drain of the second transistor is connected to the first clock signal.

A more complete understanding of the present invention can be obtained by considering the following detailed description in conjunction with the accompanying drawings, in which:

FIGS. 1 and 2 illustrate a preferred embodiment of the present invention wherein corresponding elements bear the same reference numeral. FIG. 1 utilizes the so-called bubble symbolism wherein large transistor arrays can be readily drawn.

Figure 1:
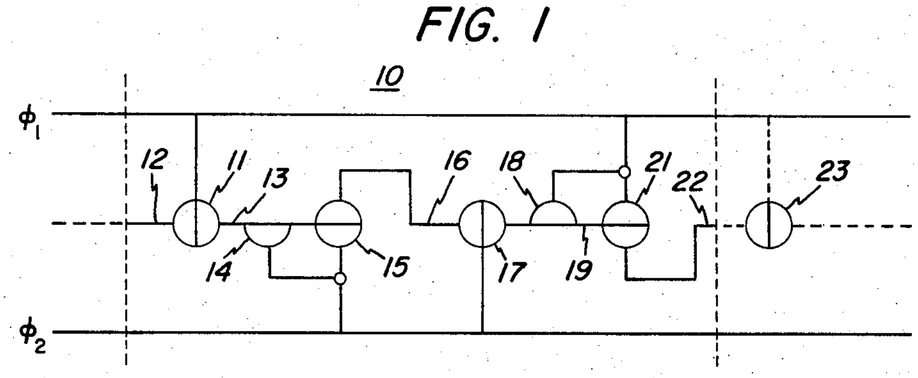
FIG. 1 illustrates a shift register in accordance with the present invention in what is known as "bubble" symbolism.

Shift register stage 10 comprises a first transistor 11 having the drain thereof connected to input line 12 and the source thereof connected to a conductive path 13 connected to the gate of transistor 15. Conductive path 13 also forms the gate electrode of voltage variable capacitor 14 which has the drain thereof connected to the drain of transistor 15. The source of transistor 15 is connected to the drain of transistors 17 by conductive path 16. The source of transistor 17 is connected by way of conductive path 19 to the gate of transistor 21. Conductive path 19 also serves as the gate electrode for voltage variable capacitor 18 which has the drain thereof connected to the drain of transistor 21. The source of transistor 21 is connected to conductive path 22 which forms the output for stage 10. Transistor 23 having the drain thereof connected to conductive path 22 forms the first transistor of the next stage and corresponds to transistor 11. The gate of transistor 11 and the drain of transistor 21 are connected to the first phase, $\phi_1$, of a two phase clock signal. The drain of transistor 15 and the gate of transistor 17 are connected to the second phase, $\phi_2$, of the two phase clock signal.

As previously noted, shift register stage 10 includes voltage variable capacitor elements 14 and 18 coupled to the gate and drain electrodes of transistors 15 and 21, respectively. Voltage variable capacitor elements 14 and 18 are utilized to selectively couple clock signals to the storage node formed by the gate electrodes of transistors 15 and 21. A detailed description of the construction and operation of these devices is given in application Ser. No. 146,966, filed May 26, 1971, and assigned to the assignee of the present invention.

Figure 2:
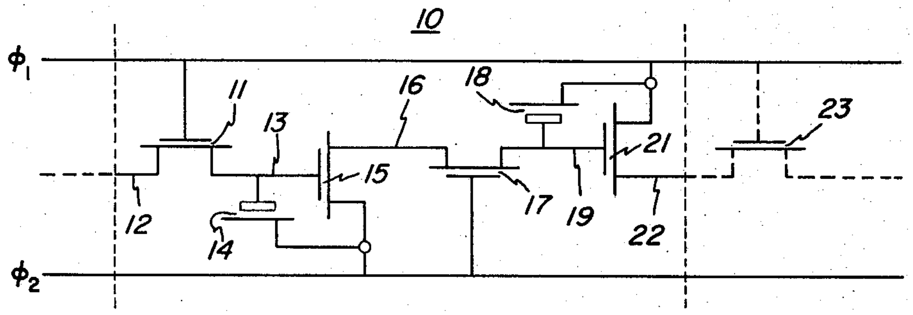
FIG. 2 illustrates a shift register in accordance with the present invention in conventional symbolism.

Briefly stated however, voltage variable capacitor elements 14 and 18 each comprise one electrode and the gate structure of a field effect transistor. The gate is connected to the gate of "host" transistor and the electrode utilized may comprise either a separate electrode or the source or drain of the host transistor as illustrated in FIGS. 1 and 2. Voltage variable capacitors 14 and 18 may preferably comprise an enlarged gate portion connected to the gate of host transistors 15 and 21 and overlying a portion of the drain electrodes of transistors 15 and 21, respectively.

When charge is stored on the storage node formed by the gate of either transistor 15 or 21, an inversion layer forms in the substrate underneath the gate structure connecting the source and drain together. This inversion layer also forms under the gate structure of voltage variable capacitor 14 or 18 and is coupled to the drain of transistor 15 or 21. This inversion layer underneath the gate electrode and the gate electrode itself thus form the two plates of a capacitor which then couples the voltage on the clock signal lines to the gate electrode of the associated transistor.

Thus, when charge is stored on the gate of transistor 15 for example, voltage variable capacitor 14 is in an active state. A pulse on clock line $\phi_2$ is thus coupled by the voltage variable capacitor to the gate electrode of transistor 15 where the voltage amplitude of the clock signal adds to the voltage on the gate of transistor 15 so as to enhance the turning on of transistor 15. In so doing, the threshold loss that would normally be encountered through transistor 15 is eliminated and the source-drain resistance of transistor 15 is lowered, thereby enabling it to more effectively conduct current.

Figure 3:
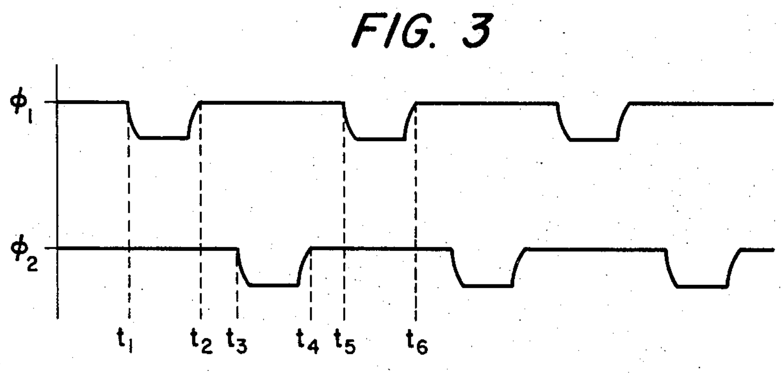
FIG. 3 illustrates the clock signals utilized in the operation of the shift register in accordance with the present invention.

The overall operation of shift register stage 10 may best be understood by also considering FIG. 3 in which the two phase clock signal is illustrated with times of particular interest designated by a dashed line. The pulses of FIG. 3 are negative going from a zero reference level, implying that the transistors utilized in shift register stage 10 are p-channel transistors. Obviously n-channel transistors are equally suitable in implementing the present invention. In the following description, the negative going pulse is considered high for a logic 1, and the zero reference level is considered low or logic 0.

A high level input signal, a logic 1, applied to input line 12 is transferred to the storage node formed by the gate of transistor 15 during the time when phase one of the clock pulse signal is high. During this time from $t_1$ to $t_2$ the gate electrode of transistor 11 is coupled to a high voltage thereby turning on transistor 11 and providing a conductive path from input line 12 to the gate of transistor 15.

At the end of the phase one pulse, at $t_2$, transistor 11 is turned off thereby trapping charge on the gates of voltage variable capacitor 14 and transistor 15. The charge stored on these gates turns on voltage variable capacitor 14 and transistor 15. During the phase two clock pulse, from time $t_3$ to time $t_4$, a conductive path is provided from the phase two line, $\phi_2$, through transistors 15 and 17 to the gate electrode of transistor 21.

Since the gate electrode of transistor 21 is connected by a conductive path to the phase two clock signal, the information is refreshed while being transferred from the first half of the stage 10, comprising transistors 11 and 15, to the second half of stage 10, comprising transistors 17 and 21. The charge stored on the gate electrode of transistor 15 serves to control the resistance of the conductive path between the phase two clock signal and the second storage node, the gate of transistor 21. As previously described, voltage variable capacitor 14, when activated, serves to enhance the gate voltage on transistor 15 thereby producing a lower source-drain resistance then would otherwise be obtained.

The second half of stage 10 shifts the information to the next stage in a similar fashion in response to a clock signal on the phase one line. That is, during the time $t_5$ to $t_6$ a conductive path formed by transistors 21 and 23 couples the phase one line, $\phi_1$, to the first storage node of the succeeding stage, assuming that a logic one is stored on the storage node formed by the gate electrode of transistor 21. Thus the logic 1 applied to input line 12 is shifted out of stage 10 and, in the process, again refreshed.

If a logic zero were applied to input line 12, then no charge would be coupled to the gate electrode of transistor 15. If a logic 1 had previously been stored on the first storage node of stage 10, then charge would be conducted away from the storage node by the activation of transistor 11. This stored charge is dissipated by leakage current and by being transferred to the source capacitance of the preceeding stage. The capacitance of the sources of transistors 15 and 21 must be larger than their gate capacities to prevent a false logic 1 transfer when a logic 0 follows a logic 1.

The dissipation of the charge on the storage nodes of stage 10 need only be sufficient to fall below the threshold voltage of the voltage variable capacitors. Once the voltage variable capacitors are turned off the enhancement of the voltage on the gate of either transistor 15 or transistor 21 does not take place and hence these transistors are in a relatively high impedance state.

While illustrated in FIG. 3 as being separated in time, it will be appreciated that the two phase clock signal need only comprise pulses sufficiently separated to be distinguishable. The pulses on line $\phi_1$ and $\phi_2$ may actually overlap in time, for example at the ten percent level, provided that the transistors used for stage 10 can distinguish the two. At the other extreme, the pulses on lines $\phi_1$ and $\phi_2$ need only be long enough to refresh the information upon transfer.

There is thus provided by the present invention an improved shift register stage in which voltage losses are minimized or eliminated, high speed operation can take place, and the configuration of which requires approximately 30 percent less space than with conventional shift register stages. By minimizing or eliminating the effects due to threshold losses, reduced clock voltages may be employed thereby reducing peripheral circuit complexity and power dissipation. Thus, extremely long shift register chains, such as used in some memory applications analogous to a drum or disk type memory, are feasible utilizing the shift register stage of the present invention.

In view of the foregoing, it will be apparent to those of skill in the art that various modifications can be made within the spirit and scope of the present invention.

What we claim as new and desire to secure by Letters Patent of the United States is:

1. A shift register having a plurality of stages, each stage having two halves wherein each half comprises:
   a source of two phase clock signals;
   first and second field effect transistors; and
   a voltage variable capacitor formed by the gate and drain electrode of a field effect transistor;
   wherein the drain of said first transistor forms the input to the half and the source of the first transistor is coupled to the gate of the second transistor, the source of the second transistor forms the output of the half, said voltage variable capacitor is coupled between the gate and drain of the second transistor, the gate of the first transistor is coupled to a first phase of said clock signals and the drain of said second transistor is connected to the second phase of said clock signals, and wherein the second half of the stage has the converse connections to said clock signals.

2. A shift register as set forth in claim 1 wherein the drain of said voltage variable capacitor is connected to the drain of said second transistor and the gate of said voltage variable capacitor is connected to the gate of said second transistor.

3. A shift register as set forth in claim 2 wherein said transistors are p-channel transistors.

4. A shift register having at least one stage comprising:

a first conductive path;

a first charge storage node coupled to said first conductive path;

a second conductive path controlled by the charge stored on said first storage node;

a third conductive path series connected with said second conductive path;

a second charge storage node; and a source of two phase clock signals for controlling said first and third conductive paths by first and second phase clock signals, respectively.

5. A shift register as set forth in claim 4 and further comprising:

voltage variable capacitor means coupled to said first and second charge storage nodes.

6. A shift register as set forth in claim 4 wherein said second conductive path selectively conducts said second clock signal to said second charge storage node to refresh the information stored in said stage.

7. A shift register having at least one stage comprising:

first, second, third and fourth field effect transistors;

a source of two phase clock signals;

said first transistor having the source-drain path thereof connected to the gate of said second transistor;

said second and third transistors having the source-drain paths thereof series connected between one of said phases of clock signals and the gate of said fourth transistor;

said fourth transistor having the source-drain path thereof connected between the other of said phases of clock signals and the output of said stage;

the gate of said third transistor connected to said one of said phases of clock signals and the gate of said first transistor connected to said other of said phases of clock signals; and first and second voltage variable capacitors coupling the gates of said second and fourth transistors to said one and other of said clock signals, respectively.

* * * * *